E. HUGHES & I. SCHOFIELD.
NUT LOCK.
APPLICATION FILED DEC. 15, 1915.
1,190,414.
Patented July 11, 1916.
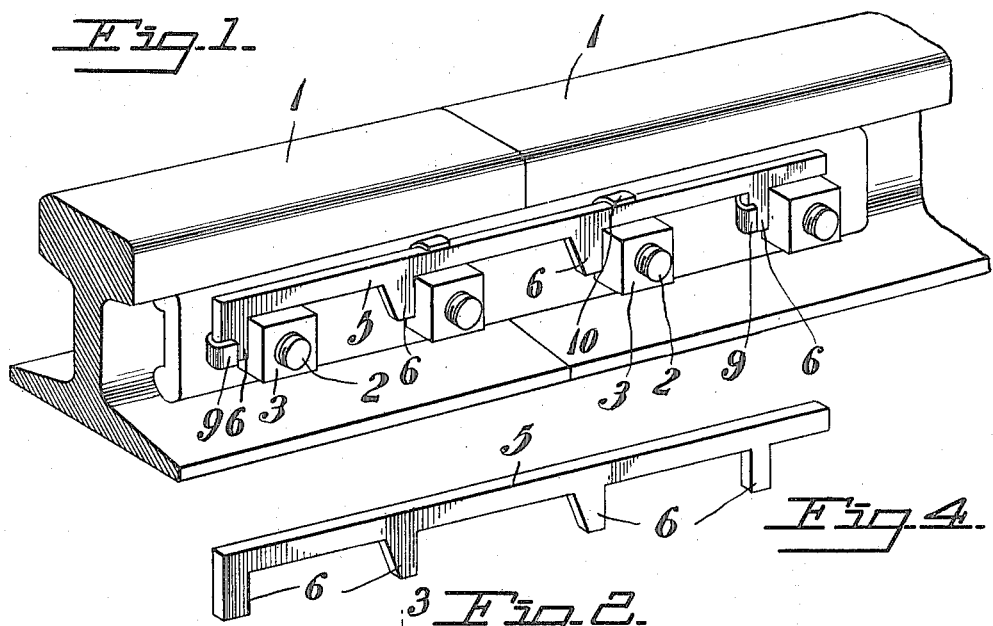
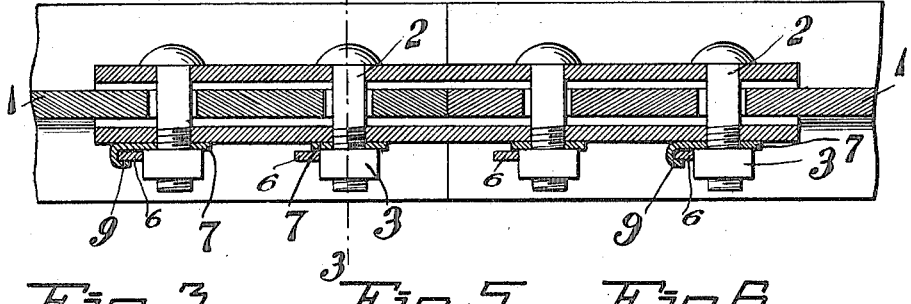
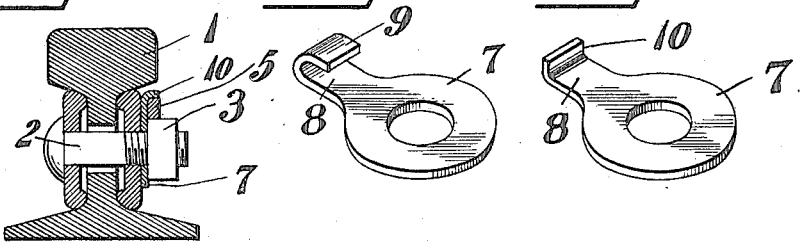
Witnesses
John D. Spalding
Wm. J. North
Inventors
E. Hughes
I. Schofield
By Victor J. Evans
Attorney

UNITED STATES PATENT OFFICE.

EDWARD HUGHES, OF FORESTVILLE, AND IRVING SCHOFIELD, OF AVON, CONNECTICUT.

NUT-LOCK.

1,190,414. Specification of Letters Patent. Patented July 11, 1916.

Application filed December 15, 1915. Serial No. 67,003.

*To all whom it may concern:*

Be it known that we, EDWARD HUGHES, a citizen of the United States, and IRVING SCHOFIELD, a subject of the British Empire, residing, respectively, at Forestville and Avon, in the county of Hartford and State of Connecticut, have invented new and useful Improvements in Nut-Locks, of which the following is a specification.

This invention relates to improvements in nut locks, primarily adapted for employment upon the nuts of railway joints, but, of course, susceptible to uses in other connections, the object of the invention being to provide a simple, cheap and effective device of this character which may be easily and quickly applied to locking engagement with the nuts or removed therefrom and which will effectively hold the nuts against accidental unscrewing.

With the above and other objects in view, the improvement resides in the construction, combination and arrangement of parts set forth in the following specification and falling within the scope of the appended claim.

In the drawing: Figure 1 is a perspective view illustrating the application of our improvement, Fig. 2 is a central longitudinal sectional view taken on a line with the center of the bolts, Fig. 3 is a transverse section approximately on the line 3—3 of Fig. 2, Fig. 4 is a perspective view of the locking bar, Fig. 5 is a similar view of one of the hook washer members, and Fig. 6 is a similar view of one of the intermediate bolt washer members.

In the drawing, 1—1 designates two alining rails which have fish plates upon their opposite sides through which pass bolts 2 which have threaded thereon nuts 3 to connect the said rails.

Our improvement contemplates the employment of an elongated bar 5 which at desired intervals is formed upon one of its longitudinal edges with right angularly disposed fingers 6. The fingers are so arranged that all of the same will contact with each of the nuts upon one of the sides of the nuts, so that one of the end fingers is arranged at the end of the bar and the opposite end finger is disposed a suitable distance away from the end of said bar, and thus the inner edge of the bar will rest upon all of the nuts.

Before the bar is applied to the nuts, we arrange upon the bolts washer members 7 formed with flat extensions 8 that terminate in hooks 9. The intermediate series of hooks engage with the upper edge of the bar 5, while the outer or end hooks engage with the end fingers 6 of the said bar. The intermediate series of washer members preferably have their hooks comprising only angular members, the said hooks for distinction being indicated by the numerals 10, but the hooks of the end washers are arranged to engage not only with one of the edges of the end fingers but with the outer faces of the said fingers.

To remove the locking member it is merely necessary to grasp the upper edge of the same or to insert a suitable instrument between the upper edge of the same and one of the fish plates of the rail and to force the same outwardly in an angular direction which will cause the intermediate hook members to become disengaged from the upper edge of the bar and a further upward pull will permit of the end fingers being disengaged from the hook members of the end washers.

From the above description, taken in connection with the accompanying drawing, the simplicity of the device, as well as the advantages thereof will, it is thought, be perfectly apparent to those skilled in the art to which such invention appertains without further detailed description.

Having thus described the invention what we claim is:

In a device for the purpose set forth, bolts and nuts for the bolts, washer members arranged upon the bolts and contacted with the nuts, said washer members having their ends hooked, the hooks of the intermediate series of washer members comprising angle flanges and being disposed at an angle with relation to the hooks of the end washer members, a lock bar having angular fingers upon one of its edges, and its end fingers adapted to be passed in engaging position with the hooks of the end washers and swung to cause its outer longitudinal edge to be engaged by the hoods of the intermediate washer members, as and for the purpose set forth.

In testimony whereof we affix our signatures in presence of two witnesses.

EDWARD HUGHES.
IRVING SCHOFIELD.

Witnesses:
W. W. Foss,
Marshall P. Ryder.

Copies of this patent may be obtained for five cents each, by addressing the "Commissioner of Patents, Washington, D. C."